(12) United States Patent
Uyanik et al.

(10) Patent No.: US 9,476,233 B2
(45) Date of Patent: Oct. 25, 2016

(54) HOOD LATCH ASSEMBLY

(71) Applicant: VOLVO CAR CORPORATION, Gothenburg (SE)

(72) Inventors: Gabriel Uyanik, Gothenburg (SE); Goran Junback, Gothenburg (SE); Jan Palovaara, Gothenburg (SE)

(73) Assignee: VOLVO CAR CORPORATION (SE)

( * ) Notice: Subject to any disclaimer, the term of this patent is extended or adjusted under 35 U.S.C. 154(b) by 0 days.

(21) Appl. No.: 14/601,567

(22) Filed: Jan. 21, 2015

(65) Prior Publication Data

US 2015/0211265 A1    Jul. 30, 2015

(30) Foreign Application Priority Data

Jan. 30, 2014    (EP) .................................... 14153276

(51) Int. Cl.
| | |
|---|---|
| *E05B 85/04* | (2014.01) |
| *B60R 21/38* | (2011.01) |
| *E05B 77/08* | (2014.01) |
| *B60R 21/34* | (2011.01) |

(52) U.S. Cl.
CPC ............ *E05B 85/045* (2013.01); *B60R 21/38* (2013.01); *E05B 77/08* (2013.01); *B60R 2021/343* (2013.01); *Y10T 292/1075* (2015.04)

(58) Field of Classification Search
CPC ..... E05B 85/045; E05B 77/08; B60R 21/38; B60R 2021/343; Y10T 292/1075
See application file for complete search history.

(56) References Cited

U.S. PATENT DOCUMENTS

| | | | | |
|---|---|---|---|---|
| 4,917,417 A | * | 4/1990 | Aubry ...................... | E05B 83/24 292/117 |
| 4,991,884 A | * | 2/1991 | Cairns ...................... | E05B 83/24 292/28 |
| 5,172,945 A | * | 12/1992 | Doherty .............. | E05B 17/0037 292/47 |
| 5,997,230 A | * | 12/1999 | Dodd ....................... | F42B 3/006 411/20 |
| 6,106,033 A | * | 8/2000 | Ruckert .................. | E05B 83/16 292/216 |
| 6,149,210 A | * | 11/2000 | Hunt ....................... | E05B 83/16 292/216 |
| 6,666,483 B2 | * | 12/2003 | Baniak .................... | E05B 83/24 292/123 |
| 7,946,376 B2 | * | 5/2011 | Hayashi .................. | B60R 21/38 180/274 |
| 8,573,658 B2 | * | 11/2013 | Kim ........................ | B60R 21/34 292/201 |
| 8,690,591 B2 | * | 4/2014 | Charnesky .......... | B60L 11/1818 191/12.4 |
| 2007/0246944 A1 | | 10/2007 | Sundararajan et al. | |
| 2010/0237632 A1 | * | 9/2010 | Browne ............. | E05B 47/0009 292/201 |
| 2012/0306237 A1 | * | 12/2012 | Farooq .................... | B60R 21/38 296/193.11 |
| 2013/0300134 A1 | * | 11/2013 | Jayasuriya .............. | E05B 77/08 292/129 |

OTHER PUBLICATIONS

Extended European Search Report Dated Jul. 7, 2014, Application No. 14153276.2-1503, Applicant Volvo Car Corporation, 4 Pages.

* cited by examiner

*Primary Examiner* — Darlene Condra

(74) *Attorney, Agent, or Firm* — Brooks Kushman P.C.

(57) ABSTRACT

A hood latch assembly is provided comprising a first member arranged to be mounted to a body member within an engine compartment of a vehicle. The first member comprises a lock mechanism. The hood latch assembly further comprises a second member arranged to be mounted to the hood of the vehicle and comprising a striker arranged to engage with the lock mechanism to retain the hood of the vehicle in the closed position. The second member further comprises a hood bracket arranged to be mounted to the hood of the vehicle, a striker bracket comprising the striker, and a mechanical lock arranged to lock the striker bracket to the hood bracket, the mechanical lock being arranged to allow unlocking by movement of an actuator. The present disclosure also relates to active hood latch system and a vehicle comprising a hood latch assembly and/or an active hood latch system.

20 Claims, 3 Drawing Sheets

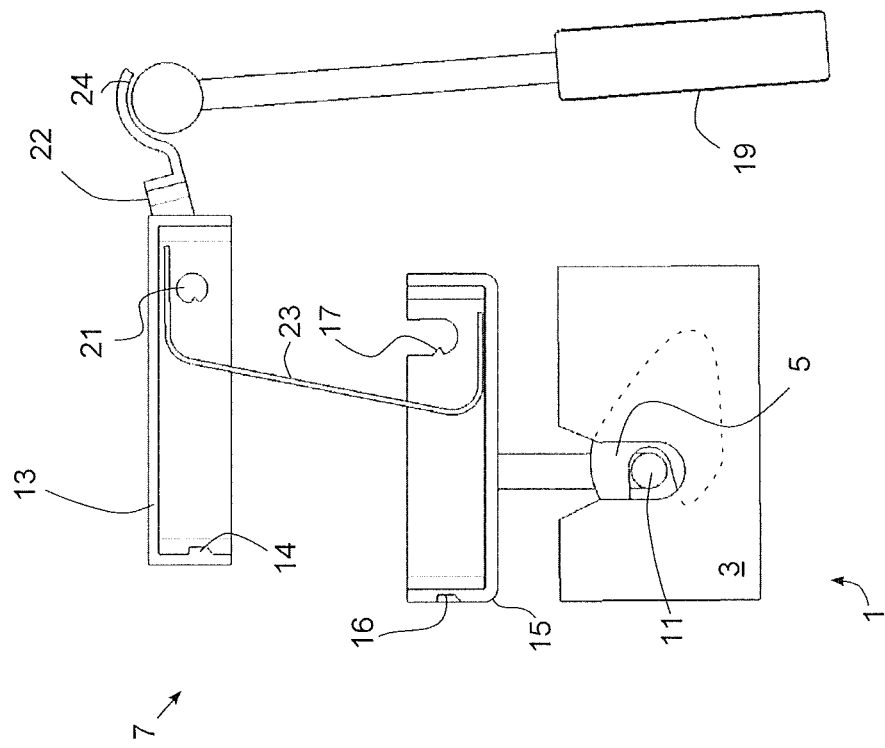
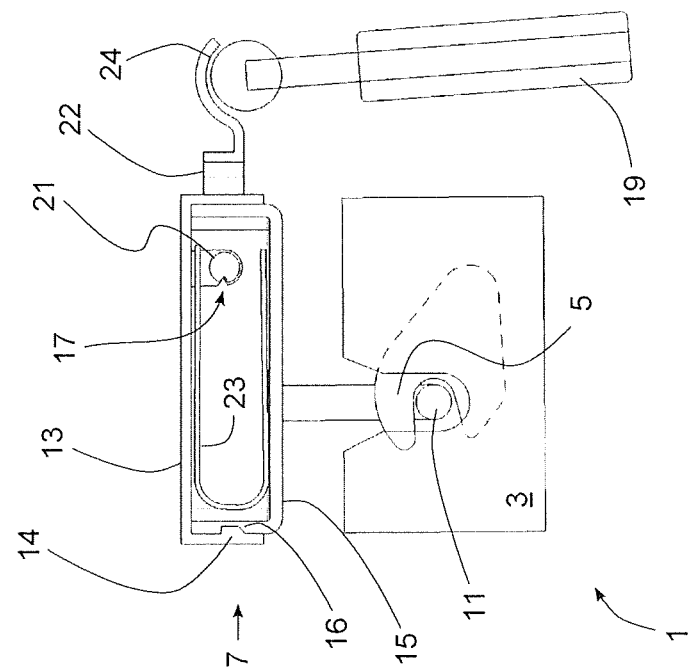
Fig. 1A
Fig. 1B

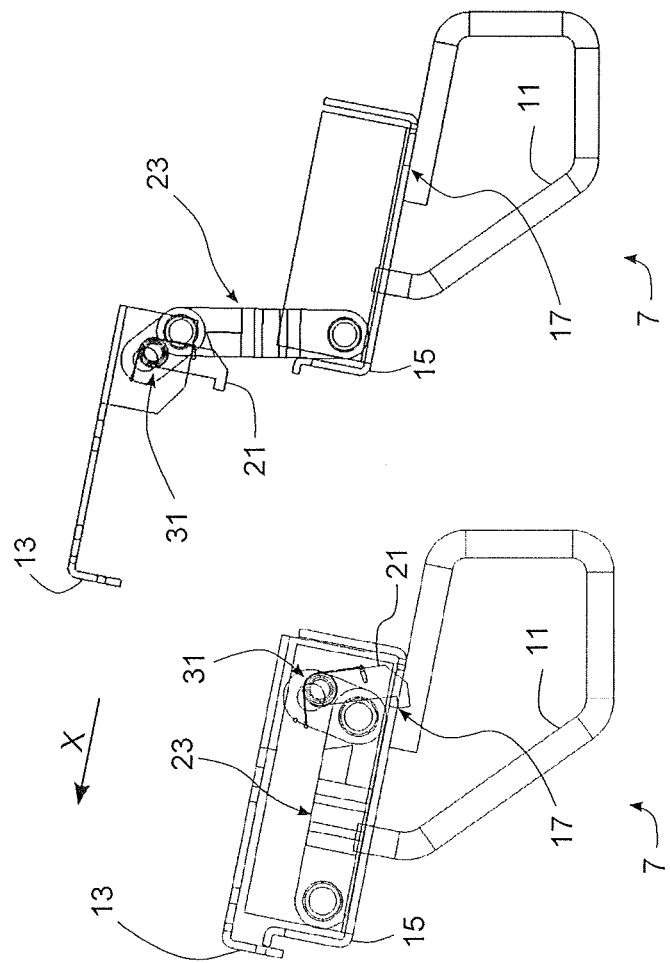
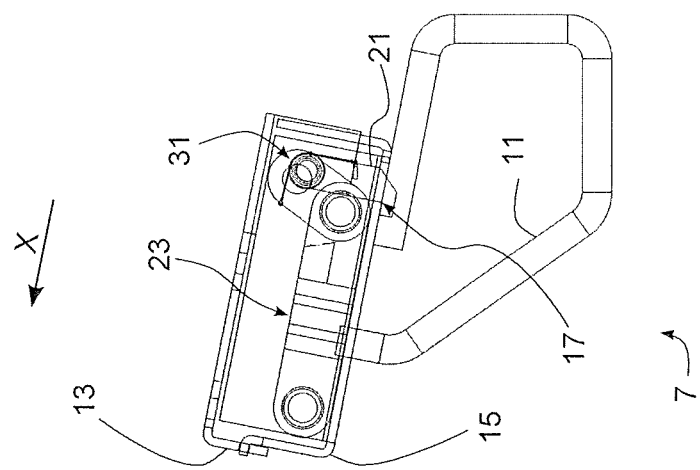

HOOD LATCH ASSEMBLY

CROSS-REFERENCE TO RELATED APPLICATIONS

This application claims foreign priority benefits under 35 U.S.C. §119(a)-(d) to European patent application number EP 14153276.2, filed Jan. 30, 2014, which is incorporated by reference in its entirety.

TECHNICAL FIELD

The present disclosure relates to a hood latch assembly. The present disclosure also relates to an active hood latch system comprising a hood latch assembly and a vehicle comprising a hood latch assembly or an active hood latch system.

BACKGROUND

In recent years vehicle hood designs have been improved to reduce damages incurred during a pedestrian collision. This is partly due to regulations which have come into effect in Japan and Europe that place a limit on the severity of pedestrian head injury when struck by a motor vehicle. Among these improved vehicle hood designs, some solutions utilize controlled deformation of the sheet metal of the vehicle hood, to form a force absorbing surface during a collision with a pedestrian. Some solutions utilize an airbag developed in an area between an upper edge of the hood and the windscreen of the vehicle, to protect the head of the pedestrian from damages. Such a pedestrian airbag may, in a deployed state, at least partly cover the windscreen and/or the A-pillars of the vehicle. Some solutions utilize spring force actuators or pyrotechnic actuators to raise a rear portion of the vehicle hood to a raised position. Such solutions can reduce damages incurred during a pedestrian collision by reducing the likelihood of the pedestrians head hitting the windshield and by increasing a distance between the hood and hard engine parts in the engine compartment of the vehicle. Some solutions utilize a combination of the above mentioned solutions.

However, all the above mentioned solutions involve some movement of the hood, either before, or during an impact with a pedestrian. Therefore, care must be taken when designing the fittings of the hood. In a closed position, a modern vehicle hood is usually attached to the host vehicle by two hinges each being arranged at an edge of the hood facing the windshield and by a hood latch assembly, arranged on an opposite leading edge of the hood essentially facing in an intended direction of travel. Thus, in view of the above mentioned, there is a need for a hood latch assembly allowing movement of a vehicle hood in relation to the vehicle.

SUMMARY

An object of the present disclosure is to provide a hood latch assembly allowing movement of a vehicle hood in relation to the vehicle in a simple and reliable manner.

According to an aspect of the disclosure, the object is achieved by a hood latch assembly comprising a first member arranged to be mounted to a body member within an engine compartment of a vehicle, said first member comprising a lock mechanism, a second member arranged to be mounted to the hood of the vehicle comprising a striker arranged to engage with said lock mechanism to retain the hood of the vehicle in the closed position, the second member further comprising a hood bracket arranged to be mounted to the hood of the vehicle, a striker bracket comprising said striker, and a mechanical lock arranged to lock said striker bracket to said hood bracket, said mechanical lock being arranged to allow unlocking by movement of an actuator.

Since the mechanical lock is arranged to lock said striker bracket to said hood bracket and since the mechanical lock is arranged to allow unlocking by movement of an actuator, after such unlocking the hood bracket is separated from the striker bracket. Thereby, movement of a vehicle hood in relation to the vehicle is allowed in a simple and reliable manner.

As a result, the above mentioned object is achieved.

Further, since the hood bracket is separated from the striker bracket and since the striker is comprised in the striker bracket, the striker is retained in the lock mechanism of the first member even after the separation. Thereby, a hood latch assembly is provided allowing movement of a vehicle hood in relation to the vehicle and where standard component first members can be utilized, i.e., standard component members arranged to be mounted to a body member within an engine compartment of a vehicle comprising the lock mechanism. Thereby, the hood latch assembly can be provided at low cost.

Even further, since the hood bracket is separated from the striker bracket, a simple hood latch assembly is provided allowing movement of a vehicle hood in relation to the vehicle in a reliable manner.

Even further, since the striker is retained in the lock mechanism of the first member even after the separation, a hood latch assembly is provided, allowing movement of a vehicle hood in relation to the vehicle whilst, occupying little space.

According to some embodiments, said mechanical lock comprises a bracket locking member displaceable between a first position and a second position, where said hood bracket is mechanically locked to the striker bracket via said mechanical lock when said bracket locking member is in the first position, and where said hood bracket is mechanically unlocked from said striker bracket when said bracket locking member is in the second position. In such embodiments, since the mechanical lock comprises a bracket locking member, a simple and reliable solution for the locking and unlocking is provided.

According to some embodiments, said bracket locking member is arranged to be displaced from the first position to the second position by movement of the actuator. In such embodiments, since the bracket locking member is arranged to be displaced from the first position to the second position by movement of the actuator, the hood bracket can be mechanically unlocked from said striker bracket by the movement of the actuator. As a result, a hood latch assembly is provided where the hood bracket is separated from the striker bracket upon actuation of the actuator. Thereby, a reliable separation can be performed and movement of the hood in relation to the vehicle can be allowed even before a collision with a pedestrian.

According to some embodiments, said bracket locking member is arranged to be displaced from the first position to the second position by said hood bracket being displaced in relation to said striker bracket by the movement of the actuator. In such embodiments, since the bracket locking member is arranged to be displaced from the first position to the second position by said hood bracket being displaced in relation to said striker bracket by the movement of the actuator, an unlocking of the hood bracket from the striker bracket may be performed simply by displacing the hood bracket in relation to the striker bracket using the actuator. Thereby, a simple and reliable unlocking may be performed.

According to some embodiments, said hood bracket is displaced in relation to said striker bracket via a movement of the hood. In such embodiments, unlocking of the hood bracket from the striker bracket may be performed simply by displacing the hood in relation to the vehicle using the actuator. Such displacing of the hood may be performed by one or more actuators displacing the hood in a direction towards the windshield of the vehicle, to thereby protect the head of a pedestrian from hitting the windshield. Thereby, due to the hood bracket being displaced in relation to said striker bracket via a movement of the hood, a simple and reliable separation of the hood bracket from the striker bracket may be performed.

According to some embodiments, the hood latch assembly comprises a lift limiter arranged to limit an available separation distance between the hood bracket and the striker bracket. In such embodiments, since the available separation distance between the hood bracket and the striker bracket is limited by the lift limiter, a position and/or a movement of the hood in relation to the vehicle can be limited even after separation of the hood bracket from the striker bracket. Thereby, overall vehicle safety is improved.

According to some embodiments, said lift limiter comprises a linkage, a textile band or a metal band. In such embodiments, since the lift limiter comprises a linkage, a textile band or a metal band a simple and reliable lift limiter is provided.

Further embodiments herein aim to provide an active hood latch system comprising a hood latch assembly according to some embodiments. In such embodiments, since the active hood latch system comprises a hood latch assembly according to some embodiments, an active hood latch system is provided that allows for movement of a vehicle hood in relation to the vehicle in a simple and reliable manner. Again, as a result, the above mentioned object is achieved. Further, in such active hood latch systems, standard component lock mechanisms can be used, and an active hood latch system can be provided being simple, reliable, space saving and which can be provided at low cost.

According to some embodiments, the active hood latch system further comprises the actuator, where the actuator is arranged to, in response to a detected event, displace said bracket locking member from the first position to the second position. In such embodiments, since the actuator is arranged to, in response to a detected event, displace said bracket locking member from the first position to the second position, the hood bracket can be mechanically unlocked from said striker bracket by the movement of the actuator. As a result, an active hood latch system is provided where the hood bracket is separated from the striker bracket upon actuation of the actuator. Thereby, a simple and reliable separation can be performed and a movement of the hood in relation to the vehicle can be allowed even before a collision with a pedestrian.

According to some embodiments, said actuator comprises a pyrotechnical cartridge. In such embodiments, since the actuator comprises a pyrotechnical cartridge, quick and reliable displacement of the bracket locking member from the first position to the second position can be achieved.

According to some embodiments, said actuator is further arranged to raise said hood in response to the detected event. In such embodiments, since the said actuator is arranged to raise said hood in response to the detected event, the hood can be raised in response to a detected impending collision with a pedestrian, whereby injury during a pedestrian impact can be reduced through the increased distance between the hood and underlying engine parts.

According to an aspect of the disclosure, the object is achieved by a vehicle comprising a hood latch assembly according to some embodiments and/or an active hood latch system according some embodiments. In such embodiments, since the vehicle comprises a hood latch assembly according to some embodiments and/or an active hood latch system according some embodiments, a vehicle is provided where a movement of a vehicle hood is allowed in relation to the vehicle in a simple and reliable manner. Again, as a result, the above mentioned object is achieved.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The various aspects of the disclosure, including its particular features and advantages, will be readily understood from the following detailed description and the accompanying drawings.

FIG. 1A illustrates a hood latch assembly according to some embodiments;

FIG. 1B illustrates the hood latch assembly illustrated in FIG. 1A with the bracket locking member in the second position;

FIG. 2A illustrates a second member of a hood latch assembly according to some embodiments;

FIG. 2B illustrates the second member of a hood latch assembly illustrated in FIG. 2A where the hood bracket has been displaced in relation to the striker bracket;

FIG. 2C illustrates the second member of a hood latch assembly where the hood bracket has been separated from the striker bracket.

DETAILED DESCRIPTION

Figure 3:
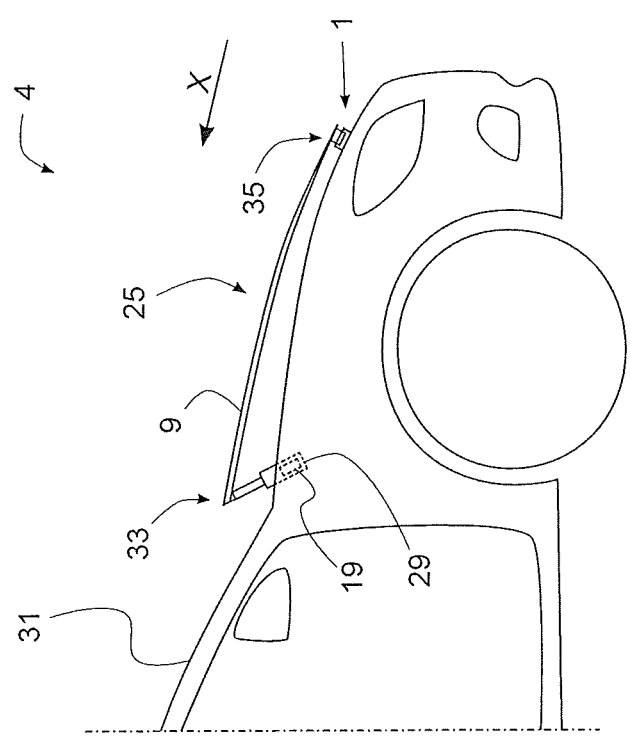
FIG. 3 illustrates an active hood latch system according to some embodiments and a vehicle comprising a hood latch assembly according to some embodiments and an active hood latch system according to some embodiments.

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

Embodiments herein will now be described more fully with reference to the accompanying drawings, in which example embodiments are shown. Disclosed features of example embodiments may be combined as readily understood by one of ordinary skill in the art. Like numbers refer to like elements throughout.

Well-known functions or constructions will not necessarily be described in detail for brevity and/or clarity.

FIG. 1A illustrates a hood latch assembly 1 according to some embodiments comprising a first member 3 and a second member 7. The first member 3 is arranged to be mounted to a body member within an engine compartment of a vehicle. Such body member within an engine compartment of a vehicle may for example be a beam securely fixed onto the chassis of the vehicle or a beam forming part of the chassis of the vehicle. The first member 3 comprises a lock mechanism 5. The second member 7 is arranged to be mounted to the hood of the vehicle. The second member 7 comprises a striker 11 arranged to engage with the lock mechanism 5 to retain the hood of the vehicle in the closed position. The lock mechanism 5 may be a lock mechanism as previously known in the art. The lock mechanism 5 is arranged such that it can be positioned in a locking position and an unlocking position, where the lock mechanism 5 is arranged to lock the striker 11 from movement in the locking position and allow movement of the striker in a direction away from the lock mechanism 5 in the unlocking position. The lock mechanism 5 is arranged such that it can be displaced from the locking position to the unlocking position via a control arrangement, such as a wire, to admit opening of a vehicle hood during normal use of the hood latch assembly 1. In FIG. 1A, as well as in FIG. 1B, the lock mechanism 5 is illustrated in the locking position.

The second member 7 further comprises a hood bracket 13, arranged to be mounted to the hood of the vehicle. For the purpose of mounting to the hood of the vehicle, the hood bracket 13 may comprise holes for screws, bolts or rivets. Likewise, for the purpose of mounting to a body member within an engine compartment of the vehicle, the first member 3 may comprise holes for screws, bolts or rivets. The second member 7 further comprises a striker bracket 15 comprising the striker 11, and a mechanical lock 17, 21 arranged to lock the striker bracket 15 to the hood bracket 13. The mechanical lock 17, 21 is arranged to allow unlocking by movement of an actuator 19. Thereby, following such unlocking, movement of a vehicle hood in relation to the vehicle is allowed in a simple and reliable manner.

According to some embodiments, the mechanical lock 17, 21 comprises a bracket locking member 21 displaceable between a first position and a second position, where the hood bracket 13 is mechanically locked to the striker bracket 15 via the mechanical lock 17, 21 when the bracket locking member 21 is in the first position, and where the hood bracket 13 is mechanically unlocked from the striker bracket 15 when the bracket locking member 21 is in the second position. In FIG. 1A, the bracket locking member 21 is illustrated in the first position. In the embodiment shown in FIG. 1A, the bracket locking member 21 is provided with an aperture and the striker bracket 15 is provided with a knob 17, where the aperture of the bracket locking member 21 and the knob 17 of the striker bracket 15 are arranged such that knob 17 fits in the aperture when the bracket locking member 21 is in the first position as illustrated in FIG. 1A to thereby lock the striker bracket 15 to the hood bracket 13.

FIG. 1B illustrates the hood latch assembly 1 illustrated in FIG. 1A with the bracket locking member 21 in the second position. As can be seen, the hood bracket 13 is mechanically unlocked from the striker bracket 15 when the bracket locking member 21 is in the second position. In the embodiment shown, this is due to the design of the aperture of the bracket locking member 21 and the knob 17 of the striker bracket 15. The bracket locking member 21 may be arranged to be displaced from the first position to the second position by movement of the actuator 19. Also, as can be seen in FIG. 1B, the actuator 19 may further be arranged to raise the hood. That is, in a single movement, the actuator 19 may be arranged such that it displaces the bracket locking member 21 from the first position to the second position and raises the hood of the vehicle. Also, as can be seen in FIG. 1B, the knob 14 has been released from the aperture 16. The bracket locking member 21 may be provided with a pivot arm 22, via which it may be displaced from the first position to the second position. The pivot arm 22 may be provided with a pressure plate 24 against which the actuator may abut to thereby transmit movement to the bracket locking member 21, such that the bracket locking member 21 will be displaced from the first position to the second position. Also, the actuator 19 may actively separate the hood bracket 13 from the striker bracket 15, such that the hood of the vehicle is raised. This may be performed by the actuator 19 exerting a force onto the pressure plate 24. In FIG. 1B, the hood latch assembly 1 is illustrated in such a raised position.

Also, the mechanical lock 17, 21 may be arranged to cooperate with structural lock elements 14, 16 of the hood bracket 13 and the striker bracket 15 which are arranged to further lock the striker bracket 15 to the hood bracket 13. Such structural lock elements may be knob 14 arranged to fit in an aperture 16 which knob 14 is arranged to leave the aperture 16 as a result of an inclination of the hood bracket 13 in relation to the striker bracket 15 due to a force of the actuator 19.

The hood latch assembly 1 may comprise a lift limiter 23, arranged to limit an available separation distance between the hood bracket 13 and the striker bracket 15. The lift limiter 23 illustrated in FIG. 1A and FIG. 2A comprises a band, which may be provided in metal or textile. As an alternative, the lift limiter may comprise a linkage for the purpose of limiting the available separation distance between the hood bracket 13 and the striker bracket 15.

FIG. 2A illustrates the second member 7 of a hood latch assembly according to some embodiments. The second member 7 is arranged to be mounted to the hood of the vehicle. The second member 7 comprises a striker 11 arranged to engage with a lock mechanism of a first member (not shown) to retain the hood of the vehicle in the closed position. The second member 7 further comprises a hood bracket 13 arranged to be mounted to the hood of the vehicle. For the purpose of mounting to the hood of the vehicle, the hood bracket 13 may comprise holes for screws, bolts or rivets. The second member 7 further comprises a striker bracket 15, comprising the striker 11 and a mechanical lock 17, 21 arranged to lock the striker bracket 15 to the hood bracket 13. The mechanical lock 17, 21 is arranged to allow unlocking by movement of an actuator (not shown). Thereby, movement of a vehicle hood in relation to the vehicle is allowed in a simple and reliable manner.

FIG. 2B illustrates the second member 7 of a hood latch assembly illustrated in FIG. 2A where the hood bracket 13 has been displaced in relation to the striker bracket 15. The mechanical lock 17, 21 comprises a bracket locking member 21 displaceable between a first position and a second position. In FIG. 2A, the bracket locking member 21 is illustrated in the first position, and in FIG. 2B the bracket locking member 21 is illustrated in the second position. The hood bracket 13 is mechanically locked to the striker bracket 15 via the mechanical lock 17, 21 when the bracket locking member 21 is in the first position, and the hood bracket 13 is mechanically unlocked from the striker bracket 15 when the bracket locking member 21 is in the second position. In the embodiments shown in FIGS. 2A-2C, the bracket locking member 21 is provided in the form of an pivotable hook arranged to extend through an aperture 17 provided in the striker bracket 15 to thereby, together with said aperture 17, form the mechanical lock 17, 21. The bracket locking member 21 may be biased by a spring 31 in a direction towards the first position. Thereby, the bracket locking member 21 can be retained in the first position to ensure the mechanical lock between the hood bracket 13 and the striker bracket 15.

The bracket locking member 21 may be arranged to be displaced from the first position to the second position by the hood bracket 13 being displaced in relation to the striker bracket 15 by movement of the actuator.

As can be seen in FIG. 2B, the hood bracket 13 have been displaced a distance in the direction x in relation to the striker bracket 15 as compared to the hood bracket 13 illustrated in FIG. 2A. Also, as can be seen in FIG. 2B, as a consequence of the displacement of the hood bracket 13 in relation to the striker bracket 15, the bracket locking member 21 has been displaced from the first position to the second position. In the second position, the hood bracket 13 is mechanically unlocked from the striker bracket 15. As a result, the hood bracket 13 may be separated from the striker bracket 15. FIG. 2C illustrates the second member 7 of a hood latch assembly where the hood bracket 13 has been separated from the striker bracket 15. Also, in the embodiment shown, the lift limiter 23 comprises a linkage. Such linkage may be used to control the movement of the hood even after the hood bracket 13 has been separated from the striker bracket 15 as well as limiting an available separation distance between the hood bracket 13 and the striker bracket 15.

According to some embodiments, the hood bracket 13 is displaced in relation to the striker bracket 15 via a movement of the hood. That is, one or more actuators may be arranged to displace the vehicle hood such that the hood bracket 13 is displaced in relation to the striker bracket 15 via the movement of the hood 9. Such a situation is illustrated in FIG. 3.

FIG. 3 illustrates an active hood latch system 25, according to some embodiments, and a vehicle 4 comprising a hood latch assembly 1, according to some embodiments, and an active hood latch system 25, according to some embodiments. The active hood latch system 25 comprises a hood latch assembly 1, according to some embodiments. As illustrated, the active hood latch system 25 may further comprise an actuator 19, where the actuator 19 may be arranged to, in response to a detected event, raise the hood 9 of the vehicle 4. Such a detected event may be a detection of an impending collision with a pedestrian. As illustrated, the hood 9 may be raised in a direction x essentially towards a windscreen 31 of the vehicle 4. Thereby the hood 9 may provide protection during an impact with a pedestrian. Such a direction x may essentially correspond to the direction x illustrated in FIG. 2A and FIG. 2B, namely a direction in which the hood bracket 13 can be displaced in relation to the striker bracket 15 in order to displace the bracket locking member 21 from the first position to the second position. Accordingly, in such embodiments, the one or more actuators 19 may be arranged to displace the hood 9 of the vehicle 4 such that the hood bracket 13 is unlocked from the striker bracket 15. As a result, simple and reliable unlocking can be performed.

The one or more actuators 19 may comprise one or more pyrotechnical cartridges 29. By using pyrotechnical cartridges 29, quick and reliable actuation of the actuators 19 can be performed.

According to some embodiments, the active hood latch system 25 comprises two or more actuators 19, each comprising at least one pyrotechnical cartridge 29, where said two or more actuators 19 are arranged to raise a trailing edge 33 of the hood 9 of the vehicle 4, said trailing edge 33 facing the windshield 31 of the vehicle 4. In combination, such an active hood latch system 25 may further comprise one or more actuators (not shown), each comprising at least one pyrotechnical cartridge, where said one or more actuators are arranged to raise a leading edge 35 of the hood 9 of the vehicle 4, said leading edge 35 essentially facing in an intended direction of travel of the vehicle 4. By using actuators comprising pyrotechnical cartridges where the actuators are arranged to raise the hood 9 both at the leading edge 35 and the trailing edge 33, damages incurred during a pedestrian collision can be further reduced.

In embodiments where one or more the actuators 19 are arranged to, in response to a detected event, raise the hood 9 of the vehicle 4, the active hood latch system 25 may comprise means to detect an impending collision with a pedestrian (not shown). Such means to detect an impending collision with a pedestrian, may, upon detection of an impending collision with a pedestrian, transmit a signal to the one or more actuators such that these are actuated. Accordingly, the "event detected" may be a detected impending collision with a pedestrian. Such means to detect an impending collision with a pedestrian may comprise one or more cameras.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A hood latch assembly for use with a vehicle having a body member and a hood, the hood latch assembly comprising:
    a first member configured to be mounted to the body member within an engine compartment of the vehicle, the first member comprising a lock mechanism;
    a second member configured to be mounted to the hood of the vehicle and comprising a striker arranged to engage with the lock mechanism to retain the hood of the vehicle in a closed position, the second member further comprising:
    a hood bracket configured to be mounted to the hood of the vehicle;
    a striker bracket comprising the striker; and
    a mechanical lock configured to lock the striker bracket to the hood bracket, the mechanical lock being unlockable by movement of an actuator, wherein the mechanical lock comprises a bracket locking member that is pivotable between a first position and a second position, the hood bracket is configured to be mechanically locked to the striker bracket via the mechanical lock when the bracket locking member is in the first position, and the hood bracket is configured to be mechanically unlocked from the striker bracket when the bracket locking member is in the second position, and wherein the bracket locking member is engageable with a locking feature when the bracket locking member is in the first position, and the bracket locking member is disengaged from the locking feature when the bracket locking member is in the second position.

2. The hood latch assembly according to claim 1 wherein the bracket locking member is arranged to be displaced from the first position to the second position by movement of the actuator.

3. The hood latch assembly according to claim 2 wherein the bracket locking member is arranged to be displaced from the first position to the second position by the hood bracket being displaced in relation to the striker bracket by the movement of the actuator.

4. The hood latch assembly according to claim 3 wherein the hood bracket is displaceable in relation to the striker bracket via a movement of the hood.

5. The hood latch assembly according to claim 1 further comprising a lift limiter arranged to limit an available separation distance between the hood bracket and the striker bracket.

6. The hood latch assembly according to claim 5 wherein the lift limiter comprises a linkage, a textile band or a metal band.

7. An active hood latch system comprising a hood latch assembly according to claim 1.

8. The active hood latch system of claim 7 wherein the active hood system comprises the actuator, and wherein the actuator is arranged to, in response to a detected event, displace the bracket locking member from the first position to the second position.

9. The active hood latch system according to claim 8 wherein the actuator comprises a pyrotechnical cartridge.

10. The active hood latch system according to claim 8 wherein the actuator is further configured to raise the hood in response to the detected event by further movement of the actuator after the mechanical lock has been unlocked.

11. The active hood latch system according to claim 8 wherein, when the active hood latch system system is mounted in the vehicle, the actuator is operable to move the hood so as to move the hood bracket relative to the striker bracket to thereby displace the bracket locket member from the first position to the second position.

12. A vehicle comprising an active hood latch system according to claim 7.

13. A vehicle comprising a hood latch assembly according to claim 1.

14. The hood latch assembly according to claim 1 wherein the striker bracket comprises the locking feature, and the bracket locking member is engageable with the striker bracket when the bracket locking member is in the first position.

15. The hood latch assembly according to claim 1 wherein the striker bracket comprises the locking feature, which comprises a knob, and the bracket locking member has an aperture that receives the knob when the bracket locking member is in the first position.

16. A vehicle comprising:
a body member;
a hood;
a hood latch assembly including a first member mounted to the body member within an engine compartment of the vehicle, and a second member mounted to the hood, the first member including a lock mechanism, and the second member including a striker engageable with the lock mechanism to retain the hood in a closed position, the second member further including a hood bracket mounted to the hood, a striker bracket comprising the striker, and a mechanical lock configured to lock the striker bracket to the hood bracket; and
an actuator configured to unlock the mechanical lock;
wherein the mechanical lock comprises a bracket locking member that is pivotable related to the striker bracket between a first position and a second position, the hood bracket is configured to be mechanically locked to the striker bracket via the mechanical lock when the bracket locking member is in the first position, and the hood bracket is configured to be second position, and wherein the bracket locking member is engageable with a locking feature when the bracket locking member is in the first position, and the bracket locking member is disengaged from the locking feature when the bracket locking member is in the second position.

17. The vehicle of claim 16 wherein the bracket locking member comprises a pivotable hook that is engageable with the striker bracket when the bracket locking member is in the first position.

18. The vehicle of claim 16 wherein the striker bracket comprises a knob, and the bracket locking member has an aperture that receives the knob when the bracket locking member is in the first position.

19. A hood latch assembly for use with a vehicle having a body member and a hood, the hood latch assembly comprises:
a first member configured to be mounted to the body member within an engine compartment of the vehicle, the first member comprises a lock mechanism;
a second member configured to be mounted to the hood of the vehicle and comprises a striker arranged to engage with the lock mechanism to retain the hood of the vehicle in a closed position, the second member further comprising:
a hood bracket configured to be mounted to the hood of the vehicle;
a striking bracket comprises the striker; and
a mechanical lock configured to lock the striker bracket to the hood bracket, the mechanical lock being unlockable by movement of an actuator, wherein the mechanical lock comprises a bracket locking member that is pivotable between a first position and a second position, the hood bracket is configured to be mechanically locked to the striker bracket via the mechanical lock when the bracket locking member is in the first position, and the hood bracket is configured to be mechanically unlocked from the striker bracket when the bracket locking member is in the second position, and wherein the bracket locking member comprises a pivotable hook that is engageable with the striker bracket when the bracket locking member is in the first position.

20. The hood latch assembly according to claim 19 further comprises a spring associated with the hook for biasing the hook toward the first position.

* * * * *

UNITED STATES PATENT AND TRADEMARK OFFICE
CERTIFICATE OF CORRECTION

PATENT NO.        : 9,476,233 B2                                   Page 1 of 1
APPLICATION NO.   : 14/601567
DATED             : October 25, 2016
INVENTOR(S)       : Gabriel Uyanik et al.

It is certified that error appears in the above-identified patent and that said Letters Patent is hereby corrected as shown below:

In the Claims

Column 10, Line 13, Claim 16:
After "configured to be"
Insert -- mechanically unlocked from the striker bracket when the bracket locking member is in the --.

Column 10, Line 29, Claim 19:
After "hood latch assembly"
Delete "comprises" and
Insert -- comprising --.

Column 10, Line 32, Claim 19:
After "the first member"
Delete "comprises" and
Insert -- comprising --.

Column 10, Line 34, Claim 19:
After "hood of the vehicle and"
Delete "comprises" and
Insert -- comprising --.

Column 10, Line 40, Claim 19:
After "a"
Delete "striking bracket comprises" and
Insert -- striker bracket comprising --.

Column 10, Line 57, Claim 20:
Delete "comprises" and
Insert -- comprising --.

Signed and Sealed this
Fourteenth Day of February, 2017

Michelle K. Lee
*Director of the United States Patent and Trademark Office*